(12) United States Patent
Bunnell

(10) Patent No.: US 10,657,705 B2
(45) Date of Patent: *May 19, 2020

(54) SYSTEM AND METHOD FOR RENDERING SHADOWS FOR A VIRTUAL ENVIRONMENT

(71) Applicant: MZ IP Holdings, LLC, Palo Alto, CA (US)

(72) Inventor: Michael Bunnell, Pleasanton, CA (US)

(73) Assignee: MZ IP Holdings, LLC, Palo Alto, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/267,977

(22) Filed: Feb. 5, 2019

(65) Prior Publication Data

US 2019/0172255 A1   Jun. 6, 2019

Related U.S. Application Data

(63) Continuation of application No. 15/924,933, filed on Mar. 19, 2018, now Pat. No. 10,235,798.

(60) Provisional application No. 62/476,061, filed on Mar. 24, 2017.

(51) Int. Cl.
  *G06T 15/40* (2011.01)
  *G06T 15/60* (2006.01)
  *G06T 19/20* (2011.01)

(52) U.S. Cl.
  CPC ............ *G06T 15/60* (2013.01); *G06T 15/405* (2013.01); *G06T 19/20* (2013.01)

(58) Field of Classification Search
  CPC ........ G06T 15/405; G06T 15/60; G06T 19/20
  See application file for complete search history.

(56) References Cited

U.S. PATENT DOCUMENTS

| | | | |
|---|---|---|---|
| 5,043,922 | A | 8/1991 | Matsumoto |
| 5,808,617 | A | 9/1998 | Kenworthy et al. |
| 5,870,098 | A | 2/1999 | Gardiner |
| 2012/0038645 | A1 | 2/2012 | Norrby |
| 2012/0127169 | A1 | 5/2012 | Barcay et al. |

OTHER PUBLICATIONS

Brotman et al., "Generating Soft Shadows with a Depth Buffer Algorithm," IEEE Computer Graphics and Applicati, IEEE Service Center, New York, NY, 4(10): 5-12. Oct. 1984.

(Continued)

*Primary Examiner* — Sing-Wai Wu
(74) *Attorney, Agent, or Firm* — Goodwin Procter LLP

(57) ABSTRACT

Implementations of the present disclosure are directed to a method, a system, and an article for rendering shadows in a graphical image of a virtual environment. An example computer-implemented method can include: generating a digital image of a virtual environment; providing a depth buffer for the digital image that includes a depth value for each pixel in the digital image; rendering a first shadow in a first region of the digital image by, at least, adjusting colors and depth values for pixels in the first region; and rendering a second shadow in a second region that partially overlaps the first region by, at least: (i) identifying a shadow rendering region to be within the second region but outside the first region, based on the adjusted depth values; and (ii) adjusting colors and depth values for pixels in the shadow rendering region.

20 Claims, 8 Drawing Sheets

(56) References Cited

OTHER PUBLICATIONS

Int'l Search Report and Written Opinion of the ISA/EP in PCT/US2018/023106, dated Jul. 24, 2018; 14 pgs.
Lui, et al., "A Survey of Shadow Rendering Algorithms: Projection Shadows and Shadow Volumes," Computer Science and Engineering, 2009, WCSE '09, Second International Workshop on, IEEE, Piscataway, NJ, pp. 488-492, Oct. 28, 2009.
Scherzer, et al., "A Survey of Real-Time Hard Shadow Mapping Methods," Computer Graphics Forum, 30(1): 169-186.

SYSTEM AND METHOD FOR RENDERING SHADOWS FOR A VIRTUAL ENVIRONMENT

CROSS-REFERENCE TO RELATED APPLICATIONS

This application is a continuation of U.S. application Ser. No. 15/924,933, filed Mar. 19, 2018, which claims the benefit of U.S. Provisional Patent Application No. 62/476,061, filed Mar. 24, 2017, the entire contents of each of which are incorporated by reference herein.

BACKGROUND

The present disclosure relates to generating images of a virtual environment and, in certain examples, to systems and methods for rendering projected shadows for the virtual environment.

In general, one technique for rendering shadows for 3D objects over 2D backgrounds is to project a shadowing object's mesh onto a ground plane, and then blend a shadow color with pixels in a frame buffer. Such a technique can effectively darken the ground where the shadow falls without making the ground completely black, which would not look natural. Due to the blending, care must be taken to render shadow pixels only once or the shadow will appear to have dark spots where mesh triangles overlap. Overlapping triangles can occur with a single shadowing mesh or with multiple shadowing meshes whose shadows overlap.

A conventional method to avoid rendering shadow mesh pixels more than once involves using a stencil buffer. In general, a stencil buffer is a per-pixel buffer (e.g., with a depth of one byte per pixel) that can be used to add more control over which pixels are rendered. The stencil buffer can be used to, for example, limit an area of rendering (e.g., stenciling). For example, stencil data contained in the stencil buffer can be used as a general-purpose per-pixel mask for saving or discarding pixels. To use the stencil buffer to avoid rendering shadow mesh pixels more than once, the stencil buffer can be cleared to 0 before rendering. The stencil function can then be set to increment on write and a stencil test can be set to stencil=1.

SUMMARY

In general, the systems and methods described herein can utilize a depth buffer to identify shadow regions in graphical images (alternatively referred to herein as digital images) and prevent shadow overdraw in such regions. When a virtual object (e.g., a first mesh element) blocks a light source and casts a shadow on a group of pixels, for example, shading can be applied by (i) blending pixel colors with a darker color and (ii) adjusting depth values for the pixels (in the depth buffer) to indicate that shading has been applied. This way, when another virtual object (e.g., a second mesh element) blocks the light source and casts a shadow on the same group of pixels, the systems and methods can recognize that shading has already been applied to the pixels and can avoid applying the shading again (e.g., shadow overdraw).

Advantageously, the approach described herein is able to achieve an accurate rendering of shadows while avoiding the creation and/or use of a stencil buffer. This can significantly reduce memory and/or computing resources required to create graphical images. In certain instances, for example, a stencil buffer can require an extra 2 bytes/pixel or about 1 Mb, 10 Mb, or more for a single image. Such memory requirements can be significant, particularly in the context of mobile devices. Further, the approach described herein can avoid computations associated with clearing and/or maintaining a stencil buffer. In general, by avoiding the creation and use of a stencil buffer, the systems and methods described herein can increase computation speeds and/or allow system resources to be devoted to other features. This can improve overall computer system performance and/or an overall user experience.

In one aspect, the subject matter described in this specification relates to a computer-implemented method. The method includes: generating a digital image of a virtual environment; providing, for the digital image, a depth buffer including a depth value for each pixel in the digital image; rendering a first shadow in a first region of the digital image, wherein rendering the first shadow includes adjusting colors and depth values for pixels in the first region; and rendering a second shadow in a second region that partially overlaps the first region, wherein rendering the second shadow includes (i) identifying a shadow rendering region to be within the second region but outside the first region, based on the adjusted depth values, and (ii) adjusting colors and depth values for pixels in the shadow rendering region.

In certain examples, generating the digital image can include rendering a ground for the virtual environment, and the first shadow and the second shadow can be rendered on the ground. Rendering the ground can include setting depth values for pixels in the ground to a background depth value. Rendering the first and second shadows can include setting depth values for pixels in the first and second regions to a shadow depth value, and the shadow depth value can be less than the background depth value. The depth values can define distances within a view frustum for the virtual environment. The first shadow can correspond to a first virtual object in the virtual environment and the second shadow can correspond to a second virtual object in the virtual environment.

In some implementations, the first virtual object and the second virtual object can include elements of a mesh in the virtual environment. Rendering the second shadow can include maintaining colors for pixels within the first region. Adjusting colors in the first region and in the shadow rendering region can include darkening colors in the first region and in the shadow rendering region. The method can include rendering a virtual object within at least one of the first region and the second region when depth values for the virtual object are less than the adjusted depth values for the first and second regions.

In another aspect, the subject matter described in this specification relates to a system. The system includes one or more computer processors programmed to perform operations including: generating a digital image of a virtual environment; providing, for the digital image, a depth buffer including a depth value for each pixel in the digital image; rendering a first shadow in a first region of the digital image, wherein rendering the first shadow includes adjusting colors and depth values for pixels in the first region; and rendering a second shadow in a second region that partially overlaps the first region, wherein rendering the second shadow includes (i) identifying a shadow rendering region to be within the second region but outside the first region, based on the adjusted depth values, and (ii) adjusting colors and depth values for pixels in the shadow rendering region.

In certain examples, generating the digital image can include rendering a ground for the virtual environment, and the first shadow and the second shadow can be rendered on the ground. Rendering the ground can include setting depth values for pixels in the ground to a background depth value. Rendering the first and second shadows can include setting depth values for pixels in the first and second regions to a shadow depth value, and the shadow depth value can be less than the background depth value. The depth values can define distances within a view frustum for the virtual environment. The first shadow can correspond to a first virtual object in the virtual environment and the second shadow can correspond to a second virtual object in the virtual environment.

In some implementations, the first virtual object and the second virtual object can include elements of a mesh in the virtual environment. Rendering the second shadow can include maintaining colors for pixels within the first region. Adjusting colors in the first region and in the shadow rendering region can include darkening colors in the first region and in the shadow rendering region. The operations can include rendering a virtual object within at least one of the first region and the second region when depth values for the virtual object are less than the adjusted depth values for the first and second regions.

In another aspect, the subject matter described in this specification relates to an article. The article includes a non-transitory computer-readable medium having instructions stored thereon that, when executed by one or more computer processors, cause the computer processors to perform operations including: generating a digital image of a virtual environment; providing, for the digital image, a depth buffer including a depth value for each pixel in the digital image; rendering a first shadow in a first region of the digital image, wherein rendering the first shadow includes adjusting colors and depth values for pixels in the first region; and rendering a second shadow in a second region that partially overlaps the first region, wherein rendering the second shadow includes (i) identifying a shadow rendering region to be within the second region but outside the first region, based on the adjusted depth values, and (ii) adjusting colors and depth values for pixels in the shadow rendering region.

Elements of embodiments described with respect to a given aspect of the invention can be used in various embodiments of another aspect of the invention. For example, it is contemplated that features of dependent claims depending from one independent claim can be used in apparatus, systems, and/or methods of any of the other independent claims

DETAILED DESCRIPTION

When rendering graphics on a computing device, such as a mobile device, it can be preferable to avoid creating and using a stencil buffer, because the stencil buffer can require, for example, extra memory and/or bus bandwidth. Previous approaches for rendering shadows in graphical images have utilized a stencil buffer to avoid shadow overdraw. In certain examples, the systems and methods described herein can use a depth buffer, rather than a stencil buffer, to avoid shadow overdraw when rendering shadows in graphical images.

In general, a depth buffer (or z-buffer) can be used to manage image depth coordinates in 3D graphics. The depth buffer can contain, for example, per-pixel floating-point data for the z-depth of each pixel rendered. In other words, when an object is rendered, the depth of a generated pixel (the z-coordinate) can be stored in the depth buffer. The depth buffer is typically arranged as a two-dimensional array (x-y) with one element for each screen pixel. If another object of a scene will be rendered at a pixel, a comparison (called "depth testing") of the two depths can be performed and the current pixel can be overridden if the object is closer to the observer. The depth of the object can then be saved to the depth buffer, replacing the old value. The depth buffer can allow such depth testing to correctly reproduce depth perception.

Figure 1:
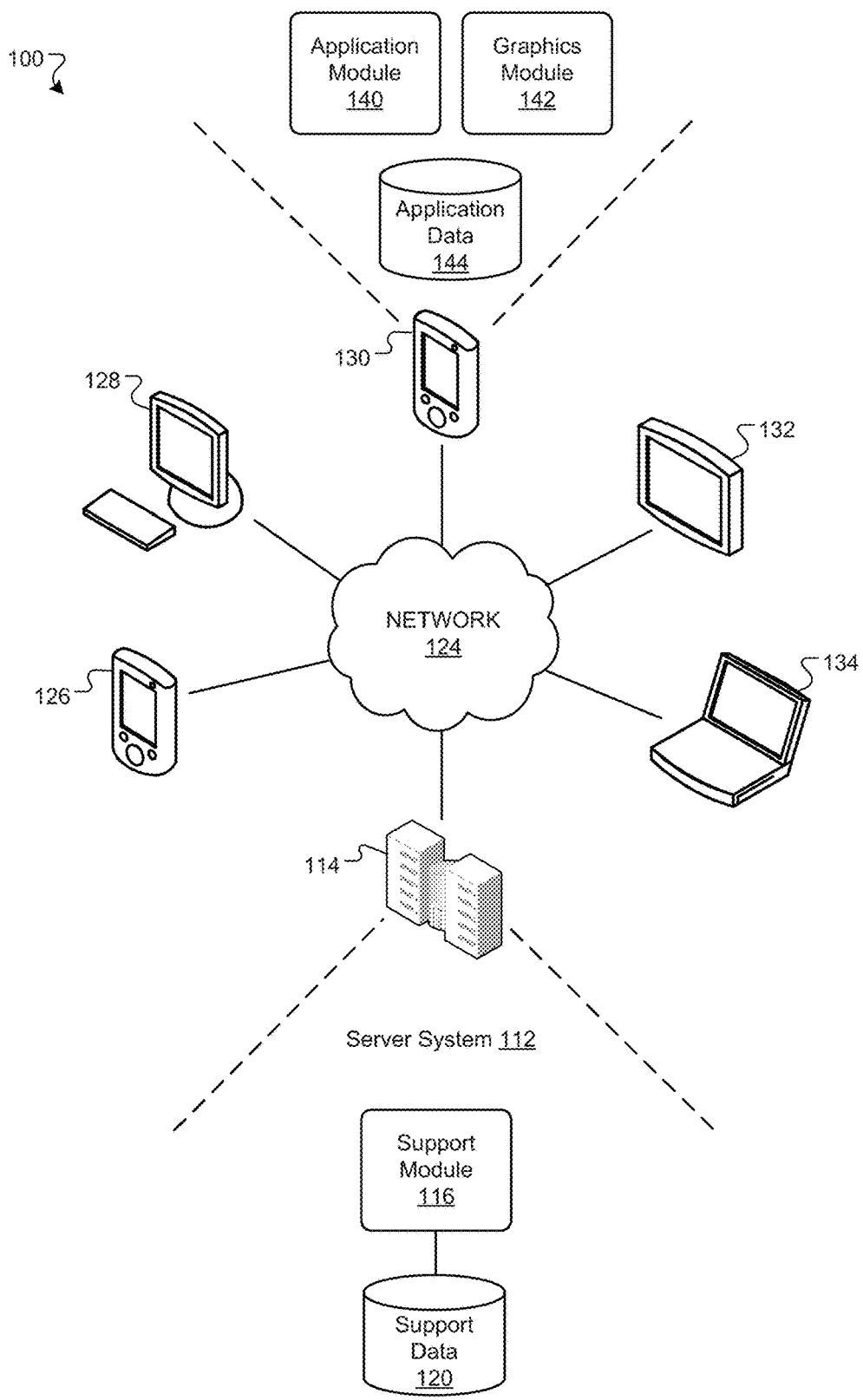
FIG. 1 is a schematic diagram of an example system for rendering shadows in graphical images.

FIG. 1 illustrates an example system 100 for rendering shadows for 3D virtual objects in a virtual environment. A server system 112 provides functionality for a software application provided to a plurality of users. The server system 112 includes software components and databases that can be deployed at one or more data centers 114 in one or more geographic locations, for example. The server system 112 software components can include a support module 116 and/or can include subcomponents that can execute on the same or on different individual data processing apparatus. The server system 112 databases can include a support data 120 database. The databases can reside in one or more physical storage systems. The software components and data will be further described below.

An application, such as, for example, a web-based or other software application can be provided as an end-user application to allow users to interact with the server system 112. The software application can be accessed through a network 124 (e.g., the Internet) by users of client devices, such as a smart phone 126, a personal computer 128, a smart phone 130, a tablet computer 132, and a laptop computer 134. Other client devices are possible.

Each client device in the system 100 can utilize or include software components and databases for the software application. The software components on the client devices can include an application module 140 and a graphics module 142. The application module 140 can implement the software application on each client device. The graphics module 142 can be used to render graphics for a virtual environment associated with the software application. The databases on the client devices can include an application data 144 database, which can store data for the software application and exchange the data with the application module 140 and/or the graphics module 142. The data stored on the application data 144 database can include, for example, depth buffer data, user data, image data, video data, and any other data used or generated by the application module 140 and/or the graphics module 142. While the application module 140, the graphics module 142, and the application data 144 database are depicted as being associated with the smart phone 130, it is understood that other client devices (e.g., the smart phone 126, the personal computer 128, the tablet computer 132, and/or the laptop computer 134) can include the application module 140, the graphics module 142, the application data 144 database, and any portions thereof.

Still referring to FIG. 1, the support module 116 can include software components that support the software application by, for example, performing calculations, implementing software updates, exchanging information or data with the application module 140 and/or the graphics module 142, and/or monitoring an overall status of the software application. The support data 120 database can store and provide data for the software application. The data can include, for example, user data, image data, video data, and/or any other data that can be used by the server system 112 and/or client devices to run the software application. In certain instances, for example, the support module 116 can retrieve image data or user data from the support data 120 database and send the image data or the user data to client devices, using the network 124.

The software application implemented on the client devices 126, 128, 130, 132, and 134 can relate to and/or provide a wide variety of functions and information, including, for example, entertainment (e.g., a game, music, videos, etc.), science, engineering (e.g., mathematical modeling), business, news, weather, finance, sports, etc. In certain examples, the software application provides a virtual environment and the systems and methods described herein are used to render images of the virtual environment.

Figure 2:
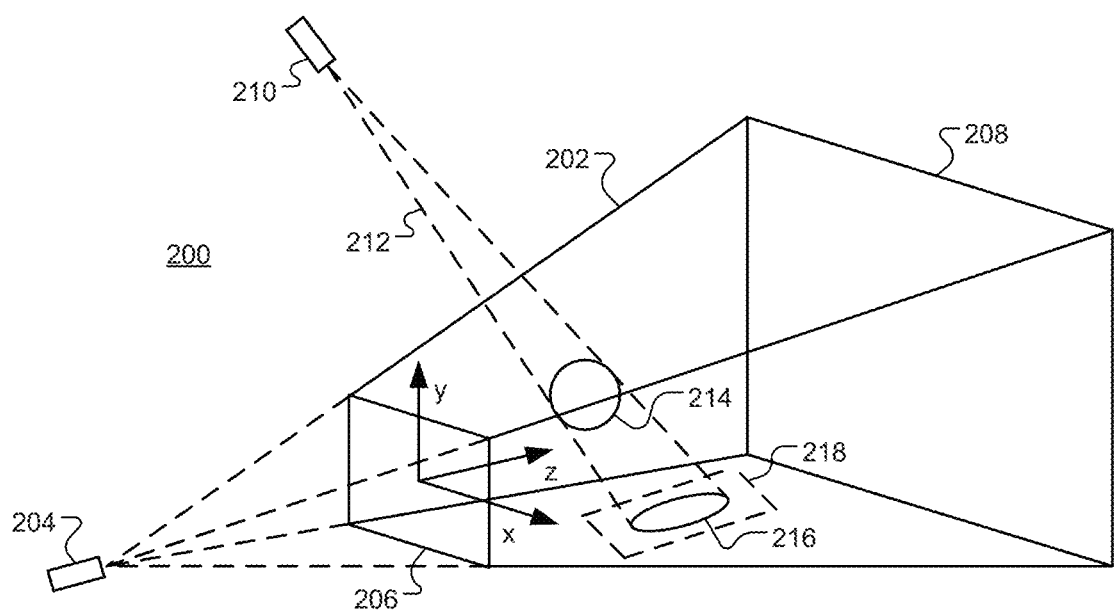
FIG. 2 is a schematic diagram of a view frustum for a virtual environment, in accordance with certain implementations of this disclosure.

Referring to FIG. 2, in various instances, graphical images for a virtual environment 200 can be generated by defining a view frustum 202. The view frustum 202 is generally pyramidal in shape and represents a portion of the virtual environment 200 that can be viewed by a camera 204 or other observer. The view frustum 202 can be bounded in a z- (or depth-) direction by a near clip plane 206 and a far clip plane 208. Virtual objects that fall within the view frustum 202 can be included in graphical images of the virtual environment 200, while virtual objects that fall outside of the view frustum 202 can be ignored and/or not included in the graphical images.

In the depicted example, the virtual environment 200 can include a light source 210 that shines light 212 on a virtual object 214 (e.g., a virtual sphere or other shape) in the virtual environment 200. The virtual object 214 can block a portion of the light 212 such that a shadow 216 of the virtual object 214 is projected onto a ground 218 or other surface in the virtual environment 200. In a typical example, the camera 204 can be positioned above the ground 218 and/or angled slightly downward (e.g., not parallel to the ground 218), so that the camera 204 can view the ground 218 and any shadows on the ground 218.

Figure 3:
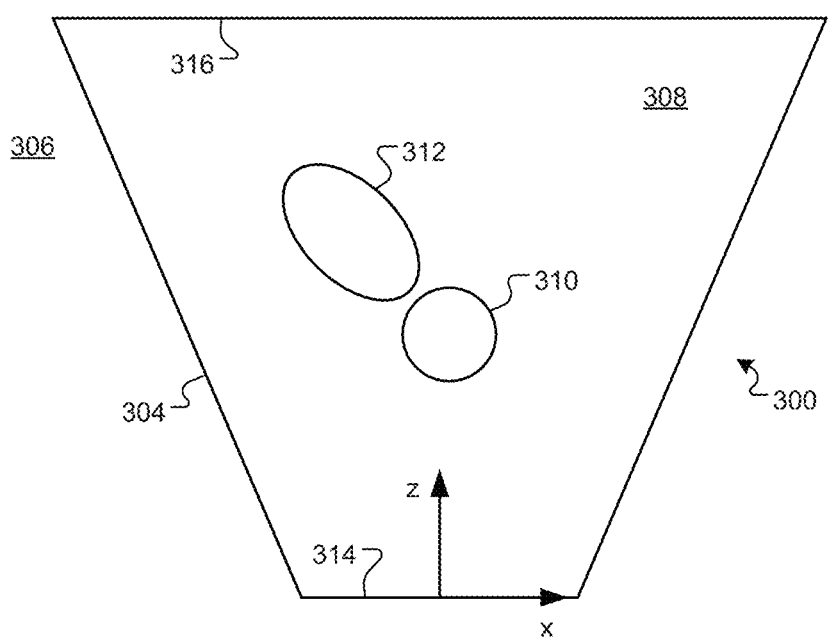
FIG. 3 is a schematic top view of a view frustum for a virtual environment, in accordance with certain implementations of this disclosure.
Figure 4:
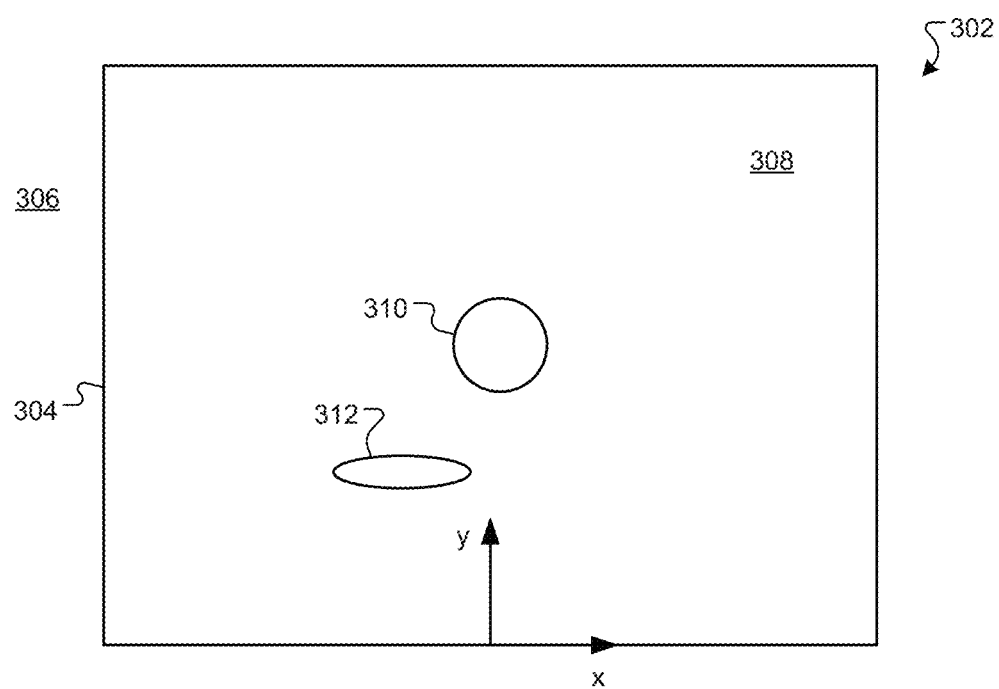
FIG. 4 is a schematic front view of a view frustum for a virtual environment, in accordance with certain implementations of this disclosure.

FIGS. 3 and 4 include a top view 300 and a front view 302, respectively, of an example view frustum 304 for a virtual environment 306 that includes a background 308 (e.g., a virtual ground, floor, wall, or combinations thereof), a first virtual object 310 (e.g., a virtual sphere or other shape), and a first shadow 312 of the first virtual object 310 on the background 308. In general, the front view 302 represents a view of the virtual environment 306 between a near clip plane 314 and a far clip plane 316, as seen by a camera (e.g., the camera 204) for the view frustum 304. A graphical image based on the view frustum 304 can be drawn from the perspective of the camera and can look identical or similar to the front view 302. The graphical image can include a variety of colors and/or textures to represent the virtual environment 306. In a typical example, the first shadow 312 can be rendered by blending one or more colors of the background 308 (e.g., green, brown, gray, or combinations thereof) with a dark color, such as black. The graphical image can be rendered using the application module 140 and/or the graphics module 142.

Figure 5:
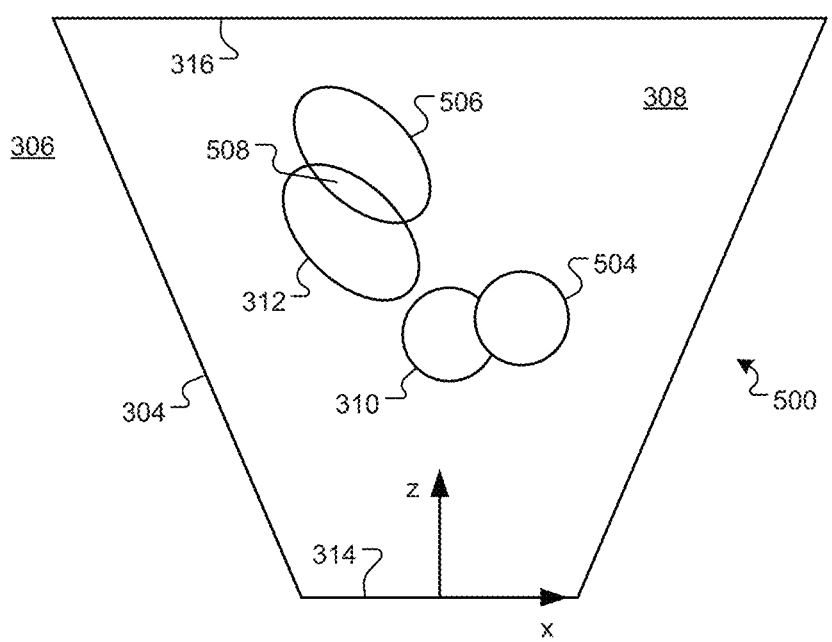
FIG. 5 is a schematic top view of a view frustum for a virtual environment, in accordance with certain implementations of this disclosure.
Figure 6:
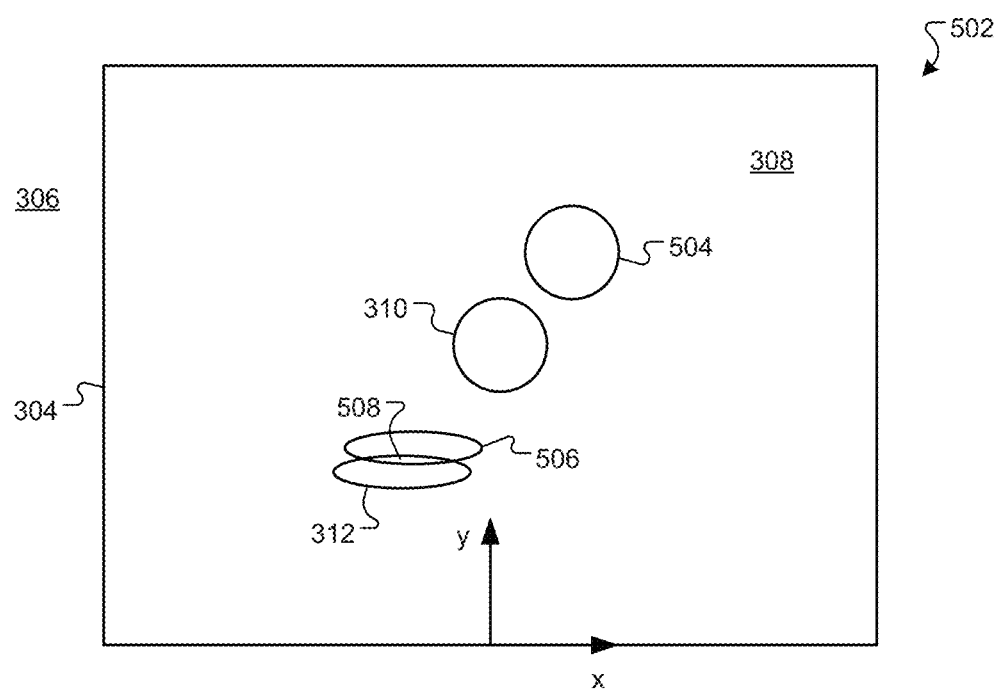
FIG. 6 is a schematic front view of a view frustum for a virtual environment, in accordance with certain implementations of this disclosure.

FIGS. 5 and 6 include a top view 500 and a front view 502, respectively, of the view frustum 304 at a different time when the virtual environment 306 includes a second virtual object 504 (e.g., a virtual sphere or other shape) and a second shadow 506 of the second virtual object 504 on the background 308. In the depicted example, the first shadow 312 and the second shadow 506 partially overlap to create an overlapped region 508. When rendering the first shadow 312 and the second shadow 506 to create a graphical image, care should be taken to avoid shadow overdraw in the overlapped region 508, such that shading is applied to the overlapped region 508 only once. Otherwise, the overlapped region 508 can be darker than other portions of the first and second shadows 312 and 506, which can be unrealistic.

In certain examples, the systems and methods described herein can use a depth buffer to avoid shadow overdraw when rendering a graphical image. As described herein, the depth buffer can store depth values associated with pixels in the graphical image. Referring again to FIG. 2, the depth value for a pixel can be, for example, a distance in the z-direction and can range from 0 (e.g., at the near view frustum 206) to 1.0 (e.g., at the far view frustum 208). The depth buffer values can be arranged as an M×N matrix, where M is a number of rows of pixels in the graphical image and N is a number of columns of pixels in the graphical image. Element (i,j) in the depth buffer can be or include, for example, a depth value for a pixel located at row i, column j of the graphical image. The depth buffer can be stored in the application data 144 database or other storage component.

Figure 7:
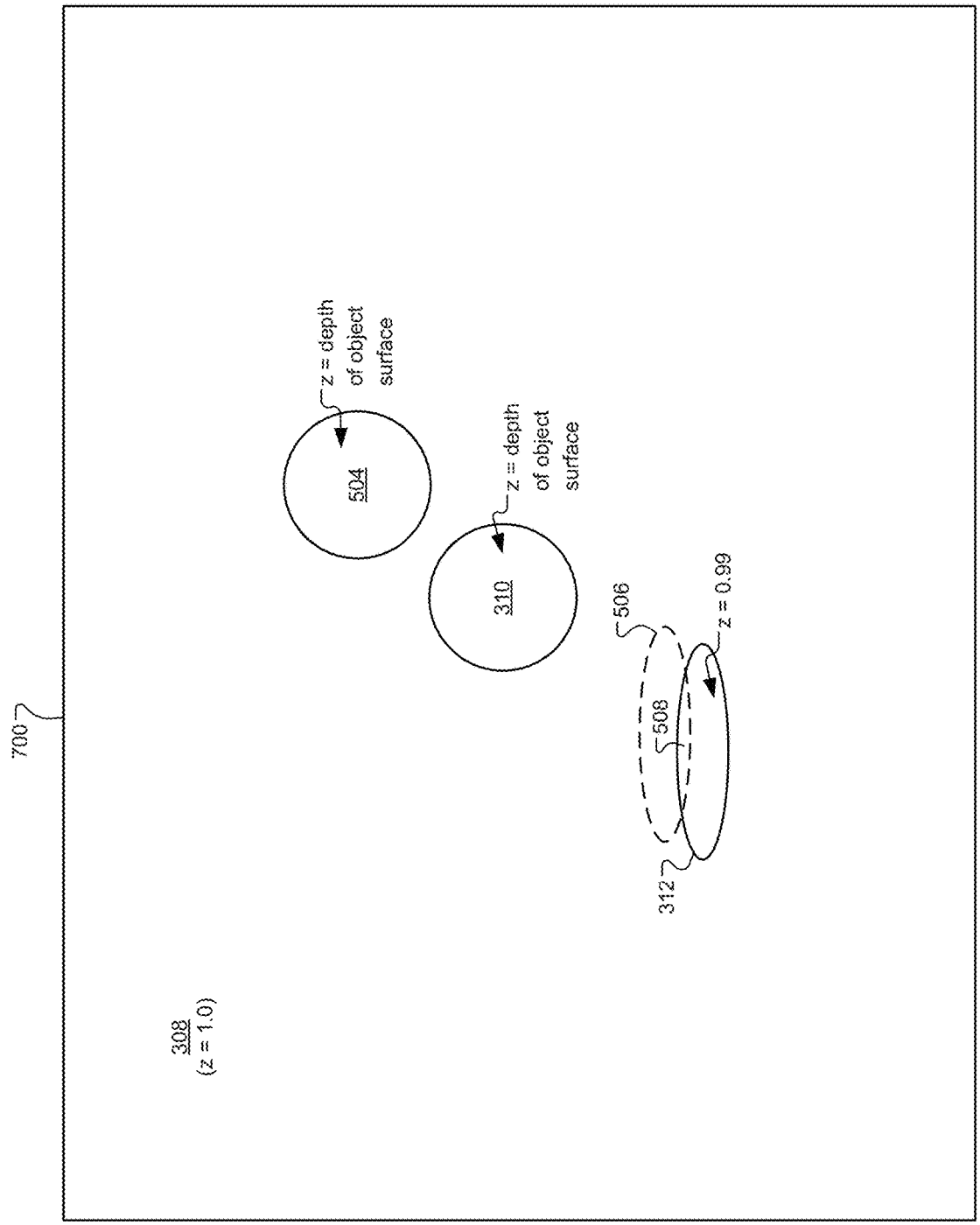
FIG. 7 is a schematic representation of a graphical image based on a view frustum for a virtual environment, in accordance with certain implementations of this disclosure.

FIG. 7 depicts a graphical image 700 based on the front view 502 as seen by a camera for the view frustum 304. The graphical image 700 can be rendered by first generating the background 308, which can be or include, for example, a ground (e.g., grass, dirt, stone, and combinations thereof), a floor, a wall, and/or other objects or surfaces. After generating the background 308, a depth buffer for the graphical image 700 can be cleared, for example, by setting depth values in the depth buffer to a maximum value (e.g., 1.0). Clearing the depth buffer can, in effect, place the background 308 at a far clip plane (e.g., the far clip plane 316) of the view frustum 304. The resulting depth of the background 308 can be referred to herein as a background depth value. In some instances, only a portion of the depth buffer (e.g., corresponding to a ground plane) may be cleared.

Next, virtual objects and shadows can be added to the graphical image 700. Prior to drawing a virtual object (or a portion thereof) at a location in the graphical image 700, a depth test can be performed (e.g., by the graphics module 142) to compare a depth of the virtual object with values in the depth buffer for that location. If the depth test indicates that the virtual object is behind one or more other objects in the graphical image 700, then the virtual object can be considered to be obstructed and may be rendered partially or not rendered at all. Alternatively, if the depth test indicates that the virtual object is not obstructed, then the virtual object can be rendered in its entirety. In FIG. 7, for example, the depth test can be used to determine that the first virtual object 310 is unobstructed (e.g., it is in front of the background and is not blocked by any other objects). The first virtual object 310 can then be added to the graphical image 700 and the depth buffer can be updated to include depth values for the first virtual object 310 at the location of the first virtual object 310. For example, the depth buffer at the location of the first virtual object 310 can be updated to include depth values for a front surface of the first virtual object 310.

The first shadow 312 can then be drawn by projecting the first virtual object 310 onto the ground or other surface in the virtual environment, according to a direction of light from a light source. Pixel colors at the shadow position can be modified by blending existing colors with a darker color (e.g., black). To indicate that the first shadow 312 has been drawn, depth values for pixels in the first shadow 312 can be set to a new value, as described herein. For example, the depth values for the pixels in the first shadow 312 can all be set to 0.99 or some other suitable value.

The second virtual object 504 can then be rendered by performing the depth test and, if the second virtual object 504 is unobstructed (as it is in FIG. 7), drawing the second virtual object 504 in the graphical image 700. The depth buffer can be updated to include depth values for the second virtual object 504 at a location of the second virtual object 504. For example, the depth buffer can be updated to include depth values for a front surface of the second virtual object 504.

When rendering the second shadow 506 for the second virtual object 504, the graphics module 142 can determine that a position of the second shadow 506 overlaps a position of the first shadow 312 to create the overlapped region 508. In this instance, the depth buffer can be used, as described herein, to determine that shading has already been applied to the overlapped region 508 but has not yet been applied to a region of the second shadow 506 that falls outside of the overlapped region 508. This latter region can be referred to herein as a shadow rendering region. To complete the rendering of the second shadow 506, pixel colors within the shadow rendering region can be blended with a darker color, in the same or similar manner that shading was applied for the first shadow 312. In this way, the depth buffer can be used to prevent shadow overdraw in the overlapped region 508, which can cause the overlapped region 508 to have a darker shadow that other portions of the first shadow 312 and the second shadow 506. In general, the overlapped region 508 should not have a darker shadow because light from the light source should be blocked uniformly, throughout the first shadow 312 and the second shadow 506.

To achieve the desired appearance, the systems and methods described herein can use the depth buffer to identify or flag shadows in the graphical image 700. In general, when a shadow is applied to a pixel (e.g., by blending the pixel color with black), a depth value for the pixel in the depth buffer can be set to a new value to indicate that a shadow has been applied. The depth value for shadow pixels can be any desired value and/or can be reserved specifically for one or more shadows. In some instances, for example, when a pixel first receives a shadow, a depth value for the pixel can be set to 0.99 or some other value to indicate that shading has been applied. The depth values for all other pixels in the shadow are preferably set to an identical value. This way, when another virtual object casts a shadow on the pixels, the systems and methods can determine that a shadow has already been applied to the pixels and can avoid shadow overdraw.

In some instances, it can preferable to choose a depth for shadow pixels that is close to a far clip plane (e.g., at 0.98 or 0.99). This can prevent the shadow from blocking or obstructing virtual objects that should be shown in the graphical image 700. Alternatively or additionally, the depth values chosen for shadow pixels can correspond to specific light sources. When there is more than one light source (e.g., a room with multiple light bulbs), for example, a first depth value (e.g., 0.98) can be used for one light source and a second depth value (e.g., 0.99) can be used for a different light source. This way, the depth buffer can distinguish between the two light sources and, if desired, a region that receives projected shadows from both light sources can have shading applied twice.

In various implementations, the first virtual object 310 and/or the second virtual object 504 can be or include elements of a mesh for a 3D virtual object. Alternatively or additionally, the first virtual object 310 and/or the second virtual object 504 can be 3D virtual objects that are represented by meshes and include mesh elements, such as triangles and vertexes. In certain examples, each element in a mesh (e.g., each mesh triangle) can be rendered separately and/or can cast a shadow. When rendering a 3D virtual object, the depth test can be utilized to determine which mesh elements should rendered and which are obstructed. Additionally or alternatively, the depth buffer can be used to prevent shadow overdraw associated with multiple mesh elements. When two elements of a mesh project shadows that overlap with one another, for example, the depth buffer can be used to prevent an overlapped region for the two shadows from receiving a shadow twice (e.g., shadow overdraw), as described herein.

In various examples, projected vertex positions for vertices in a virtual object (e.g., a virtual character) can be determined from $$\text{projected position} = \text{position} - \text{lightvector} * \frac{\text{position.y}}{\text{lightvector.y}}, \quad (1)$$

where position is a position of a vertex in virtual space, position.y is a height (e.g., a y-coordinate) of the vertex above a ground plane, lightvector is a normalized direction vector from a light source, and lightvector.y is a y-component of the light vector.

In certain implementations, coordinates for a point in a view frustum (x, y, z) can be converted to homogeneous clip space coordinates ($x_c$, $y_c$, $w_c$) using a transform matrix. For example, a model-view-projection matrix or a view-projection matrix can be used, depending on whether the projection calculation (e.g., using equation (1)) was done in model space or world space, respectively. For purposes of illustration and not limitation, a vector transform with a transform matrix can be achieved using $$\begin{bmatrix} x_c \\ y_c \\ z_c \\ w_c \end{bmatrix} = \begin{bmatrix} 1 & 0 & 0 & 0 \\ 0 & 1 & 0 & 0 \\ 0 & 0 & 1 & 0 \\ 0 & 0 & 1 & 0 \end{bmatrix} \begin{bmatrix} x \\ y \\ z \\ 1 \end{bmatrix}. \quad (2)$$

In some examples, the clip space coordinates can be converted to force a depth or z-position to be the same for all shadow pixels (e.g., x/w, y/w, 1−ε, 1), which can effectively move shadows and/or any mesh elements (e.g., vertices) for the shadows to just before a far clip plane (e.g., the far clip plane 316) and behind all non-shadow vertices in the scene, particularly when c is small (e.g., 0.01). It can be preferable to use (x/w, y/w, 1−ε, 1) rather than (x, y, 1−ε, w) for the clip space coordinates. This can avoid floating point precision problems, which can cause depth values to not be identical for every shadow pixel. Alternatively or additionally, (x, y, 1−ε, w) can be used for the clip space coordinates when floating point precision problems are mitigated, for example, using a suitable bit length.

Figure 8:
FIG. 8 includes a graphical image having shadow artifacts caused by shadow overdraw, in accordance with certain implementations of this disclosure.
Figure 9:
FIG. 9 includes a graphical image in which shadow artifacts have been eliminated, in accordance with certain implementations of this disclosure.

FIGS. 8 and 9 include graphical images 800 and 900, respectively, in which two virtual characters cast shadows 802 onto virtual ground. Image 800 includes shadow artifacts 804 (e.g., nonuniformities) caused by shadow overdraw. Such artifacts can be especially noticeable when the virtual characters are moving or animated. Image 900, by contrast, was rendered using the systems and methods described herein. The shadows 802 in image 900 are more uniform and include no shadow artifacts caused by shadow overdraw.

In some implementations, rather than forcing all shadow pixels for virtual objects and/or meshes to the same depth near a far clip plane (e.g., the far clip plane 316), all the shadow pixels for a virtual object and/or a single mesh can be forced to be at a depth that corresponds to an origin or other depth of the virtual object and/or the mesh, with an offset desired. For example, if a virtual object is located at z=0.5, shadow pixels for the virtual object can be assigned a depth of 0.51 (e.g., just beyond the virtual object). Such an alternative technique can be used to avoid shadow overdraw but may not necessarily avoid overlapping shadows from other objects. The alternative technique can be useful, for example, to render a shadow for a bird flying over a scene. The bird's shadow can fall on objects in the scene, as well as the ground. While the bird's shadow can darken other shadows, it can still look acceptable to the user.

The systems and methods described herein are not limited to any particular kind of computer platform and can, in general, be used on any client device that has depth buffer support, including mobile devices, desktop computers, and laptop computers. Most, if not all, currently available platforms can support depth buffers. Even on high-end platforms where the cost of a stencil buffer may not be a limiting factor or concern, there can be appropriate applications in which the stencil buffer can be used for something other than shadows, such as rendering reflections, in which case the depth buffer technique described herein can be advantageous.

Figure 10:
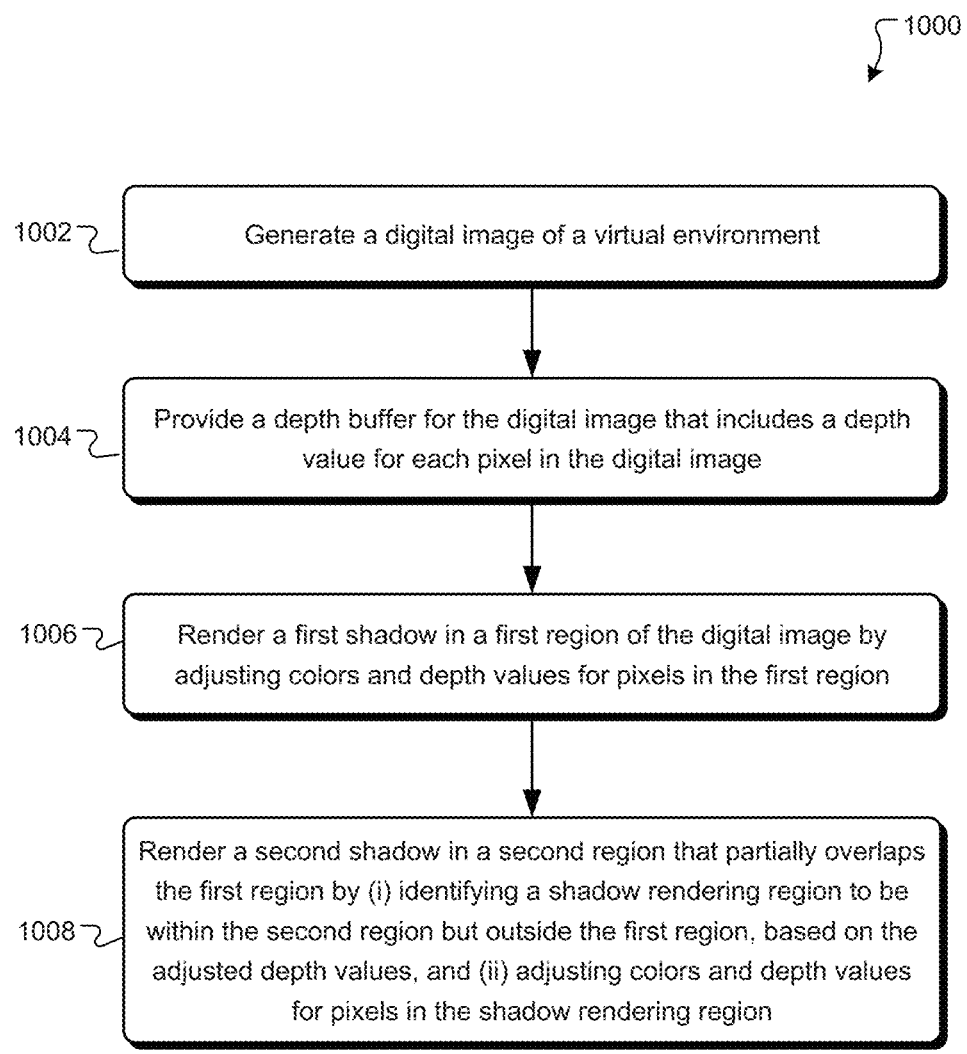
FIG. 10 is a flowchart of an example method of rendering shadows in graphical images.

FIG. 10 illustrates an example computer-implemented method 1000 of rendering shadows for a virtual environment. A digital image of a virtual environment is generated (step 1002). A depth buffer for the digital image is provided (step 1004) that includes a depth value for each pixel in the digital image. A first shadow is rendered (step 1006) in a first region of the digital image by, at least, adjusting colors and depth values for pixels in the first region. A second shadow is rendered (step 1008) in a second region that partially overlaps the first region by, at least, (i) identifying a shadow rendering region to be within the second region but outside the first region, based on the adjusted depth values, and (ii) adjusting colors and depth values for pixels in the shadow rendering region.

Implementations of the subject matter and the operations described in this specification can be implemented in digital electronic circuitry, or in computer software, firmware, or hardware, including the structures disclosed in this specification and their structural equivalents, or in combinations of one or more of them. Implementations of the subject matter described in this specification can be implemented as one or more computer programs, i.e., one or more modules of computer program instructions, encoded on computer storage medium for execution by, or to control the operation of, data processing apparatus. Alternatively or in addition, the program instructions can be encoded on an artificially generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic disks, magneto-optical disks, optical disks, or solid state drives. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including, by way of example, semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, implementations of the subject matter described in this specification can be implemented on a computer having a display device, e.g., a CRT (cathode ray tube) or LCD (liquid crystal display) monitor, for displaying information to the user and a keyboard and a pointing device, e.g., a mouse, a trackball, a touchpad, or a stylus, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Implementations of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some implementations, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of any inventions or of what can be claimed, but rather as descriptions of features specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable subcombination. Moreover, although features can be described above as acting in certain combinations and even initially claimed as such, one or more features from a claimed combination can in some cases be excised from the combination, and the claimed combination can be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing can be advantageous. Moreover, the separation of various system components in the implementations described above should not be understood as requiring such separation in all implementations, and it should be understood that the described program components and systems can generally be integrated together in a single software product or packaged into multiple software products.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing can be advantageous.

What is claimed is:

1. A method, comprising:
  adjusting depth values for pixels in a first region of a digital image to render a first shadow in the first region, wherein a depth buffer is provided for the digital image, wherein the depth buffer comprises a depth value for each pixel in the digital image, and wherein the adjusted depth values comprise an indication that shading has been applied to the pixels in the first region; and rendering a second shadow in a second region that partially overlaps the first region by (i) identifying a shadow rendering region to be within the second region but outside the first region, based on the indication, and (ii) adjusting depth values for pixels in the shadow rendering region.

2. The method of claim 1, comprising:
rendering a ground for a virtual environment in the digital image,
wherein the first shadow and the second shadow are rendered on the ground.

3. The method of claim 2, wherein rendering the ground comprises:
setting depth values for pixels in the ground to a background depth value.

4. The method of claim 3, comprising:
setting depth values for pixels in the first and second regions to a shadow depth value to render the first and second shadows,
wherein the shadow depth value is less than the background depth value.

5. The method of claim 1, wherein the depth values define distances within a view frustum for a virtual environment.

6. The method of claim 1, wherein the adjusted depth values comprise a depth value reserved for shadows.

7. The method of claim 1, wherein the first shadow corresponds to a first virtual object in a virtual environment in the digital image, and wherein the second shadow corresponds to a second virtual object in the virtual environment in the digital image.

8. The method of claim 1, wherein rendering the second shadow comprises:
maintaining colors for pixels within the first region.

9. The method of claim 1, comprising:
adjusting colors in the first region and in the shadow rendering region to darken the colors in the first region and in the shadow rendering region.

10. The method of claim 1, comprising:
rendering a virtual object within at least one of the first region and the second region when depth values for the virtual object are less than the adjusted depth values for the first and second regions.

11. A system, comprising:
one or more computer processors programmed to perform operations to:
adjust depth values for pixels in a first region of a digital image to render a first shadow in the first region,
wherein a depth buffer is provided for the digital image,
wherein the depth buffer comprises a depth value for each pixel in the digital image, and
wherein the adjusted depth values comprise an indication that shading has been applied to the pixels in the first region; and
render a second shadow in a second region that partially overlaps the first region by (i) identifying a shadow rendering region to be within the second region but outside the first region, based on the indication, and (ii) adjusting depth values for pixels in the shadow rendering region.

12. The system of claim 11, wherein the operations are further to:
render a ground for a virtual environment in the digital image,
wherein the first shadow and the second shadow are rendered on the ground.

13. The system of claim 12, wherein to render the ground the one or more computer processors are further to:
set depth values for pixels in the ground to a background depth value.

14. The system of claim 13, wherein the operations are further to:
set depth values for pixels in the first and second regions to a shadow depth value to render the first and second shadows,
wherein the shadow depth value is less than the background depth value.

15. The system of claim 11, wherein the depth values define distances within a view frustum for a virtual environment.

16. The system of claim 11, wherein the adjusted depth values comprise a depth value reserved for shadows.

17. The system of claim 11, wherein the first shadow corresponds to a first virtual object in a virtual environment in the digital image, and wherein the second shadow corresponds to a second virtual object in the virtual environment in the digital image.

18. The system of claim 11, wherein to render the second shadow the one or more computer processors are further to:
maintain colors for pixels within the first region.

19. The system of claim 11, wherein the operations are further to:
adjust colors in the first region and in the shadow rendering region to darken the colors in the first region and in the shadow rendering region.

20. A non-transitory computer-readable medium having instructions stored thereon that, when executed by one or more computer processors, cause the one or more computer processors to:
adjust depth values for pixels in a first region of a digital image to render a first shadow in the first region,
wherein a depth buffer is provided for the digital image,
wherein the depth buffer comprises a depth value for each pixel in the digital image, and
wherein the adjusted depth values comprise an indication that shading has been applied to the pixels in the first region; and
render a second shadow in a second region that partially overlaps the first region by (i) identifying a shadow rendering region to be within the second region but outside the first region, based on the indication, and (ii) adjusting depth values for pixels in the shadow rendering region.

* * * * *